United States Patent [19]
Zaffaroni

[11] 3,854,480
[45] Dec. 17, 1974

[54] DRUG-DELIVERY SYSTEM

[75] Inventor: Alejandro Zaffaroni, Atherton, Calif.

[73] Assignee: Alza Corporation, Palo Alto, Calif.

[22] Filed: June 2, 1970

[21] Appl. No.: 42,786

Related U.S. Application Data

[63] Continuation-in-part of Ser. Nos. 812,116, April 1, 1969, , and Ser. No. 864,175, Oct. 6, 1969.

[52] U.S. Cl. ............................................... 128/260
[51] Int. Cl. ............................................. A61m 5/00
[58] Field of Search ............ 128/260, 130, 268; 3/1;
424/19; 206/.5, 84; 236/6, 60

[56] References Cited
UNITED STATES PATENTS

| | | | |
|---|---|---|---|
| 3,630,200 | 12/1971 | Higuchi | 128/260 |
| 3,598,122 | 4/1969 | Zaffaroni | 128/268 |
| 3,577,512 | 5/1971 | Shepherd et al. | 424/21 |
| 2,736,682 | 2/1956 | Hermelin | 424/19 |
| 3,518,340 | 6/1970 | Raper | 264/251 |
| 3,039,933 | 6/1962 | Goldman | 424/19 |
| 3,093,831 | 6/1963 | Jordan | 3/1 |
| 3,432,592 | 3/1969 | Speiser | 424/19 |

OTHER PUBLICATIONS

Lehmann, "Acrylic Resin Coatings for the Manufacture of Depot Preparation of Drugs," Drugs Made in Germany, Vol. 10, 1967, pp. 115-118.
Lehmann, et al., "Permeable Acrylic Resin Varnishes for the Production of Depot Dosage Forms Part 2: Coating of Granules and Pellets, Production of Skeleton Tablets" (First Installment), Die Pharmazeutische Industrie, Vol. 31, No. 5, 1969 pp. 319-322.
Lehmann, et al., "Permeable Acrylic Resin Varnishes for the Production of Depot Dosage Forms Part 2: Coating of Granules and Pellets, Production of Skeleton Tablets" (Second Installment), Die Pharmazeutische Industrie, Vol. 31, No. 6, 1969, pp. 409-412.
Kratochvil et al., "Sustained Release Hormonal Preparations," Steroids, Vol. 15, No. 4, April 1970, pp. 505-511.

Primary Examiner—G. E. McNeill
Attorney, Agent, or Firm—Edward L. Mandell; Thomas E. Ciotti; Paul L. Sabatine

[57] ABSTRACT

Drug-delivery system for releasing drug at a controlled rate for a prolonged period of time is formed from a solid inner matrix material having solid particles of drug dispersed therethrough. Surrounding the inner matrix is an outer polymeric membrane, insoluble in body fluids. Both the inner matrix material and the outer polymeric membrane are permeable to passage of the drug by diffusion but the drug diffuses through the outer polymeric membrane at a lesser rate so that passage through the polymeric membrane is the drug release rate controlling step.

11 Claims, 3 Drawing Figures

DRUG-DELIVERY SYSTEM

CROSS REFERENCE TO RELATED APPLICATIONS

This application is a continuation-in-part of my co-pending application Ser. No. 812,116 filed Apr. 1, 1969 and my co-pending application Ser. No. 864,175 filed Oct. 6, 1969, both assigned to the assignee of the present invention.

BACKGROUND OF THE INVENTION

This invention relates to a drug-delivery system for releasing drug at a constant rate for a prolonged period of time.

In many therapeutic programs, it is desirable to provide for slow release of a drug to the body at a constant rate over a prolonged period of time. Ideally, such a rate of release has a zero order time dependence, that is, the rate of release is independent of time.

Different approaches have heretofore been tried to obtain such a drug-delivery system. One avenue which has received great attention is to mix the drug with a carrier material that is gradually broken down by body fluids, the drug being released as the carrier disintegrates. Numerous carriers have been used in such systems including waxes, oils, fats, soluble polymers, and the like. While some of these systems have provided for a delayed release of the drug, the desired constant release rate has not been obtained. One reason for this is that as the carrier disintegrates the surface area of the dosage unit decreases, exposing increasingly smaller quantities of the carrier to the surrounding body fluids. This inherently results in a decline in the release rate over time.

Another approach to this problem has been to disperse the drug throughout a solid matrix material through which the drug is released by diffusion. But this type of system has proven incapable of providing a constant drug release rate. Thus, as described by Higuchi, *J. Pharm. Sci.* 52, 1145, the theoretical amount of drug released from such a system is determined by the equation:

$$Q = \sqrt{Dt(2A - C_s)C_s}$$

where $Q$ = the amount of drug released after time $t$ per unit exposed area, $D$ = the diffusitivity of the drug in the homogeneous matrix media, $A$ = the total amount of drug present in the matrix per unit volume, and $C_s$ = the solubility of the drug in the matrix substance. From this type system, the drug release rate will decrease with time too.

Still another approach has been to enclose the drug within a capsule having polymeric walls through which the drug can pass by diffusion. See for example U.S. Pat. No. 3,279,996. These systems too have certain inherent difficulties. Thus, if only a small amount of drug is placed within the capsule, the release rate will depart from the zero order relationship because of the limited area contact of the drug particles with the inner surface of the capsule. Of course, the same departure will occur when the major portion of the drug has been released from the capsule and the remaining amount is insufficient to fully contact or wet the inner walls of the capsule. Additionally, these prior systems have generally been based on the use of silicone rubber polymers, especially polydimethylsiloxanes, as the diffusion control membrane. In large part, these silicone polymers were selected because of their high permeability to some important drug molecules. But it has now been found that this high permeability can be a significant disadvantage which defeats the primary objective of the drug-delivery system. Thus, with many important drug molecules, such as progesterone, the diffusion rate through dimethylpolysiloxane membranes is very great, often greater than the rate of clearance of the diffused drug from the outer surface of the capsule. In many instances, this results in the rate-limiting step being clearance of the drug from the exterior of the capsule, rather than diffusion through the capsule wall. Clearance rate within the body is difficult to control, is ever changing, and defeats the objective of providing a drug-delivery system which releases drug at a constant rate over time.

Despite the many efforts of the past, the only reliable technique for administering carefully controlled amounts of drug, at a constant rate, remains the intravenous drip. And this is inconvenient and impractical even where trained personnel are available.

SUMMARY OF THE INVENTION

Accordingly, an important object of this invention is to provide a drug-delivery system for prolongedly releasing drug at a controlled rate.

Still another object of this invention is to provide a drug-delivery system which can release drug at a rate which does not vary with time.

In accomplishing the objects of this invention, one feature resides in a drug-delivery system comprising a solid inner matrix material having solid particles of drug dispersed therethrough, the inner matrix being permeable to passage of the drug by diffusion. Surrounding the inner matrix is an outer polymeric membrane, insoluble in body fluids and permeable to passage of the drug by diffusion but at a lower rate than through the inner matrix. Drug diffuses through the inner matrix to and through the polymeric membrane at a controlled rate over a prolonged period of time.

Other objects, features and advantages of this invention will become more apparent from the following detailed description of the invention and from the drawings.

BRIEF DESCRIPTION OF THE DRAWINGS

In the drawings, wherein like reference numerals designate like parts.

DETAILED DESCRIPTION OF THE INVENTION

Figure 1:
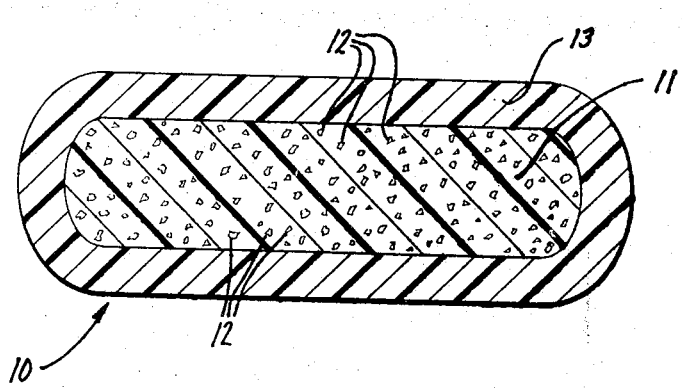
FIG. 1 is a side cross-sectional view of the drug-delivery system of the invention.

As illustrated in FIG. 1, the drug-delivery system 10 of the invention has an inner solid matrix 11 with solid particles of drug 12 dispersed therethrough. Surrounding matrix 11 is polymeric membrane 13. Both matrix 11 and polymeric membrane 13 are permeable to passage of the drug by diffusion, that is, molecules of the drug can dissolve in and diffuse through these materials. However, the permeability of matrix 11 to diffusion of the drug is greater than that of polymeric membrane 13 and polymeric membrane 13 thus acts as the rate-limiting barrier for drug release.

The inner matrix serves as a mass transfer conductor for the drug. Drug molecules, from the surface of the dispersed solid particles, dissolve in the matrix and move through the matrix by diffusion thereby evenly bathing the inner surface of the polymeric membrane with drug molecules. These drug molecules then dissolve in and migrate through the polymeric membrane, at a lower rate than through the matrix, ultimately reaching the outer surface of the polymeric membrane. Ordinarily, one would expect the drug migration to cease when sufficient drug has reached the outer surface of the polymeric membrane to create an equilibrium. However, when the drug-delivery system is in contact with body tissues or fluids, drug molecules are continuously removed from the outer surface of the polymeric membrane and absorbed by the body. For best results, the rate of passage of drug through the polymeric membrane should not exceed the rate of removal or clearance of drug from the exterior of the device by body tissues or fluids. This ensures that the drug-delivery rate is dependent on diffusion through the polymeric membrane, which can be controlled, rather than upon clearance, which varies.

The drug-delivery system of the invention provides many important advantages over previous systems. Through the unique design employed, a rate of drug release having a zero order time dependence can be obtained. In addition, because the matrix material serves to transfer drug molecules to all areas of the inner surface of the polymeric membrane, the interior of the device in contact with the polymeric membrane remains substantially at the thermodynamic activity corresponding to that of the solid drug until substantially all of the drug has been released from the device by diffusion through the polymeric membrane. Thus, in contrast to previously proposed diffusion controlled drug-delivery systems, the rate of release of drug from the system of the invention remains constant until the device has substantially completed its function.

The polymeric membrane, which acts as the rate-controlling barrier, is formed of a material permeable to the drug, to permit passage of the drug by diffusion through the membrane at a relatively low rate. Normally, the rate of passage of the drug through the membrane is dependent on the solubility of the drug therein, as well as on the membrane thickness. This means that selection of appropriate materials for fabricating the membrane will be dependent on the particular drug to be used. By varying the composition and thickness of the membrane, the dosage rate per area of the device can be controlled; for the membrane acts to meter the flow or diffusion of drug from the matrix to the exterior of the device. Thus, devices of the same surface area can provide different dosage of a drug by varying the characteristics of the membrane wall.

Materials used to form the membrane are those capable of forming film walls or coatings through which drug can pass at a relatively low rate. Suitable polymers are biologically compatible and insoluble in body fluids or tissues with which the device is contacted. Use of soluble polymers is to be avoided since dissolution or erosion of the device would affect the constancy of the drug release, as well as the capability of the device to remain in place, for certain uses. Exemplary materials for fabricating the polymeric membrane include polymethylmethacrylate, polybutylmethacrylate, plasticized or unplasticized polyvinylchloride, plasticized nylon, plasticized soft nylon, plasticized polyethyleneterephthalate, natural rubber, polyisoprene, polyisobutylene, polybutadiene, polyethylene, ethylene-vinyl acetate copolymers, silicone rubbers, especially the medical grade polydimethylsiloxanes, and silicone-carbonate copolymers; hydrophilic polymers such as the hydrophilic hydrogels of esters of acrylic and methacrylic acid (as described in U.S. Pat. Nos. 2,976,576 and 3,220,960 and Belgian Pat. No. 701,813), modified collagen, cross-linked polyvinylalcohol, cross-linked partially hydrolyzed polyvinylacetate, and surface treated silicone rubbers (as described in U.S. Pat. No. 3,350,216). Other polymeric membranes that are biologically compatible and insoluble in body fluids can be used. It should be noted that I do not claim as my invention the use of any of the foregoing polymers as solubility membranes except in connection with the particular device of this invention.

Various solid materials can be used to form the solid matrix having particles of the drug distributed therethrough. Essentially, any solid material chemically compatible with the drug and permeable to passage of the drug by diffusion can be employed. Exemplary matrix materials are those polymeric materials set forth above as suitable for forming the polymeric membrane.

Choices of materials for forming the membrane and matrix are governed in large part by the drug to be incorporated in the particular device, as well as by the desired rate of release of the drug. In addition, it is important to successful practice of the invention that the polymeric membrane have a lower permeability to the drug by diffusion than does the matrix. Otherwise, the membrane will not serve as the rate-controlling barrier and the intended zero order release rate will not be obtained. Generally, the matrix should have a rate of diffusion of the drug of at least twice that of the polymeric membrane. Preferably, the matrix is selected so that it has a permeability more than 10-fold that of the polymeric membrane for the particular dispersed drug.

Those skilled in the art can readily determine the rate of diffusion of drugs through materials and select suitable combinations of membrane, matrix and drug for particular applications. Various techniques can be used to determine the permeability of materials to different drugs. One that has been found to be eminently well suited is to cast or hot press a film of the material to a thickness in the range of 2 to 60 mils. The film is used as a barrier between a rapidly stirred (e.g., 150 r.p.m.) saturated solution of the drug and a rapidly stirred solvent bath, both maintained at constant temperature (typically 37°C). Samples are periodically withdrawn from the solvent bath and analyzed for drug concentration. By plotting drug concentration in the solvent bath versus time, the permeability constant P of the membrane is determined by the Fickes First Law of Diffusion.

Slope of plot $= Q_1 - Q_2/t_1 - t_2 = P\ AC/h$ wherein $Q_1 =$ cumulative amount of drug in solvent in micrograms at $t_1$ $Q_2 =$ cumulative amount of drug in solvent in micrograms at $t_2$ $t_1 =$ elapsed time to first sample i.e., $Q_1$ $t_2 =$ elapsed time to second sample i.e., $Q_2$ $A =$ area of membrane in cm$^2$ $C =$ initial concentration of drug $h =$ thickness of membrane in cm. By determining the slope of the plot i.e., $[Q_1 - Q_2/t_1 - t_2]$ and solving the equation using the known or measured values of A, C, and $h$, the permeability P constant in cm$^2$/time of the material or membrane for a given drug is readily determined. Of course, this permeability constant is an inherent characteristic of the material and is unchanged whether the material is used as the inner matrix or the outer polymeric membrane.

Using the above technique, the permeability constant P of progesterone from isotonic solution through different membranes into isotonic solution at 37°C was found to be:

| Membrane | Permeability Constant (cm$^2$/hr) |
|---|---|
| Polydimethylsiloxane [1] | $8.0 \times 10^{-2}$ |
| Polyhydroxyethylmethacrylate [2] | $8.0 \times 10^{-3}$ |
| Gum rubber | $2.0 \times 10^{-2}$ |
| Silicone-carbonate copolymer [3] | $4.0 \times 10^{-3}$ |
| Polyethylene [4] | $4.7 \times 10^{-4}$ |
| Ethylene-vinyl acetate copolymer [5] | $7.5 \times 10^{-3}$ |

[1] Dow corning Silastic 340
[2] Cross-linked with ethylene dimethacrylate
[3] General Electric MEM 213
[4] Low density; melt index of 0.85
[5] 84% ethylene, 16% vinyl acetate Using the above data to design a device of the invention to release progesterone at a constant rate, one would select polydimethylsiloxane as the matrix and any of the other polymers as the polymeric membrane. By the same experimental procedure or with others known to those skilled in the art, matrices and membranes for use with other drugs can be readily identified.

In practicing the invention, one can employ any drug used to treat the body and capable of diffusing through a polymeric membrane at a therapeutically effective rate. The term "drug" is used herein and is intended to be interpreted in its broadest sense as including any composition or substance that will produce a pharmacologic response either at the site of application or at a site remote therefrom.

Suitable drugs for use in therapy with the drug-delivery system of the invention include, without limitation:

1. Anti-infectives, such as antibiotics, including penicillin, tetracycline, chlortetracycline bacitracin, nystatin, streptomycin, neomycin, polymyxin, gramicidin, oxytetracycline, chloramphenicol, and erythromycin; sulfonamides, including sulfacetamide, sulfamethazine, sulfadiazine, sulfamerazine, sulfamethizole and sulfisoxazole; antivirals, including idoxuridine; and other anti-infectives including nitrofurazone and sodium propionate;
2. Anti-allergenics such as antazoline, methapyrilene, chlorpheniramine, pyrilamine and prophenpyridamine;
3. Anti-inflammatories such as hydrocortisone, cortisone, dexamethasone 21-phosphate, fluocinolone, triamcinolone, medrysone, prednisolone, prednisolone 21-phosphate, and prednisolone acetate;
4. Decongestants such as phenylephrine, naphazoline, and tetrahydrazoline;
5. Miotics and anticholinesterases such as pilocarpine, eserine salicylate, carbachol, di-isopropyl fluorophosphate, phospholine iodide, and demecarium bromide;
6. Mydriatics such as atropine sulfate, cyclopentolate, homatropine, scopolamine, tropicamide, eucatropine, and hydroxyamphetamine;
7. Sympathomimetics such as epinephrine;
8. Sedatives and Hypnotics such as chloral, pentabarbital sodium, phenobarbital, secobarbital sodium, codeine, ($\alpha$-bromoisovaleryl) urea, and carbromal;
9. Psychic Energizers as 3-(2-aminopropyl) indole acetate and 3-(2-aminobutyl) indole acetate;
10. Tranquilizers such as reserpine, chlorpromazine, and thiopropazate;
11. Androgenic steriods such as methyltestosterone and fluoxymesterone;
12. Estrogens such as estrone, 17$\beta$-estradiol, ethinyl estradiol, and diethyl stilbesterol;
13. Progestational agents such as progesterone, 19-norprogesterone, norethindrone, megestrol, melengestrol, chlormadinone, ethisterone, medroxyprogesterone, norethynodrel and 17$\alpha$-hydroxy-progesterone;
14. Humoral agents such as the prostaglandins, for example, PGE$_1$, PGE$_2$, and PGF$_2$;
15. Antipyretics such as aspirin, sodium salicylate, and salicylamide;
16. Antispasmodics such as atropine, methantheline, papaverine, and methscopolamine bromide;
17. Anti-malarials such as the 4-aminoquinolines, 8-aminoquinolines, chloroquine, and pyrimethamine;
18. Antihistamines such as diphenhydramine, dimenhydrinate, tripelennamine, perphenazine, and chlorophenazine;
19. Cardioactive agents such as benzydroflumethiazide, flumethiazide, chlorothiazide, and aminotrate; and
20. Nutritional agents such as essential amino acids and essential fats.

Other drugs having the same or different physiological activity as those recited above can be employed in drug-delivery systems within the scope of the present invention.

Drugs can be in different forms, such as uncharged molecules, components of molecular complexes, or non-irritating, pharmacologically acceptable salts such as hydrochloride, hydrobromide, sulphate, phosphate, nitrate, borate, acetate, maleate, tartrate, salicylate, etc. For acidic drugs, salts of metals, amines, or organic cations (e.g., quaternary ammonium) can be employed. Furthermore, simple derivatives of the drugs (such as ethers, esters, amides, etc.) which have desirable retention and release characteristics but which are easily hydrolyzed by body pH, enzymes, etc., can be employed.

The amount of drug incorporated in the drug-delivery device varies depending on the particular drug, the desired therapeutic effect, and the time span for which the device provides therapy. Since a variety of devices in a variety of sizes and shapes are intended to provide dosage regimes for therapy of a variety of maladies, there is critical upper limit on the amount of drug incorporated in the device. The lower limit too will depend on the activity of the drug and the time span of its release from the device. Thus it is not practical to define a range for the therapeutically effective amount of drug to be incorporated in or released by the device.

Drug-delivery systems of the invention can take a wide variety of shapes and forms for administering the drugs at controlled rates to different areas of the body. Thus, the invention includes external and internal drug-delivery systems such as skin patches, sublingual or buccal tablets, peroral dosage forms, implantates for releasing a drug in the tissues of a living organism, pessaries, prosthesis, artificial glands, vaginal or rectal suppositories, cervical rings, troches, drug-dispensing intrauterine devices, and ocular inserts (as described in U.S. Pat. No. 3,416,530). In each instance, the drug-delivery device has an inner matrix containing dispersed particles of the drugs surrounded by a polymeric membrane and is of appropriate known shape for implantation or insertion in the desired body tissues or cavities, respectively, or for application to a particular body area.

Figure 2:
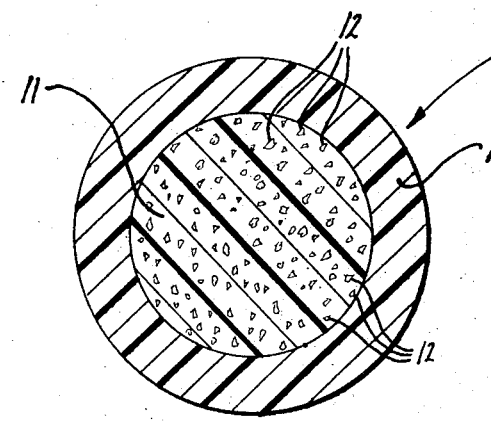
FIG. 2 is a side cross-sectional view of another configuration of the drug-delivery system of the invention.
Figure 3:
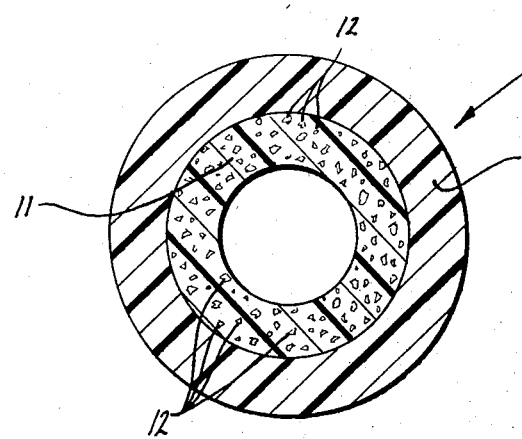
FIG. 3 is a side cross-sectional view of yet another configuration of the drug-delivery system of the invention.

As illustrated in FIG. 2, the drug dosage form can be spherical in nature. In addition, the matrix need not fill the entire interior of the device. Thus, as illustrated in FIG. 3, solid matrix 11 having particles of drug 12 dispersed therethrough can be a tube, sphere, or the like concentric with polymeric membrane 13. And, matrix 11 can enclose a central space or void 14. In this embodiment, molecules of drug 12 will diffuse to the interior and exterior surfaces of matrix 11. Molecules reaching the exterior surface of matrix 11 will migrate through membrane 13 to the outer surface of the drug-delivery system and be removed by absorption in body tissues or fluids. Drug molecules migrating to the interior surface of matrix 11 will form a thin layer of drug which will create an equilibrium and prevent further migration into cavity or void 14.

Drug-delivery systems of the invention are easily fabricated. Particles of drug are mixed with the matrix material, which can be in solid, semi-solid, or liquid form at the time, and distributed therethrough by ballmilling, calendering, stirring, shaking, or the like. Where the drug is chemically compatible with monomers or prepolymers used to form the matrix, the drug particles can be added at this earlier stage and the matrix formed in situ. The matrix material, however made and having the drug particles distributed therethrough, can then be formed to a solid shape by molding, casting, pressing, extruding, drawing, or like processes. Depending on the material used to form the matrix, curing may be necessary at this stage. Thereafter, the polymeric membrane is applied by coating or laminating according to techniques well known in themselves. This ability to shape the matrix into tubes, rods, disks, films, rings and other highly reproducible shapes of controllable composition, results in ready fabrication of devices with closely controlled characteristics and overcomes a significant disadvantage of previously described devices.

As an alternative to the above procedure, the polymeric membrane can be used as the form for shaping the matrix. Thus, a preformed shape of the polymeric membrane such as a tube or capsule, can be filled with matrix in semi-solid or liquid form having drug particles distributed therethrough. Thereafter, the matrix can be converted to a solid by curing and the polymeric membrane sealed about the matrix material. Other procedures, well known in themselves to those skilled in the art, can be used to fabricate the drug-delivery systems of the invention.

The following examples will serve to illustrate the invention without in any way being limiting thereon.

EXAMPLE 1

Milled crystals of progesterone (25 parts by weight) are mixed with polydimethylsiloxane (70 parts by weight; Dow Corning Silastic 382), and silicone oil (5 parts by weight; Dow Corning 360). To this well-stirred mixture is added a stannous octoate curing catalyst (0.25 part by weight) and the mixture is injected into a polyethylene tube having an inside diameter of 0.125 inch. After curing for 30 minutes, the silicone rubber matrix is removed from the polyethylene tube and cut to a length of 12 mm. This length of matrix is placed within a 15 mm polyethylene tube (Melt index 0.8) having an inside diameter of 0.125 inch and an outside diameter of 0.157 inch. The tube ends are sealed using polytetrafluorethylene plugs and cyanoacrylate adhesive (Eastman 910). It can be used for conception control by attachment to an intrauterine device (e.g., a Lippes loop) and inserted into the uterine lumin through the cervix. The device releases 4.3 micrograms of progesterone per day.

EXAMPLE 2

The procedure of Example 1 is repeated except that the 15mm polyethylene tube is replaced with an ethylene-vinyl acetate copolymer (16 percent vinyl acetate) tube of the same dimensions. The device releases progesterone at a rate of 65 micrograms per day.

EXAMPLE 3

Progesterone, polydimethylsiloxane, silicone oil, and stannous octoate are mixed as in Example 1. The mixture is cast to a film having a thickness of 0.3mm using a thin film spreader and cured for 30 minutes. The resulting matrix is placed between two sheets of polyethylene film (Melt index 0.8) having a thickness of 0.25mm. 1.0cm square devices are hot stamped from the assemblage. Each such device can be placed within the uterus (e.g., by attachment to a Lippes loop) and will release 11.2 micrograms of progesterone per day.

EXAMPLE 4

Example 3 is repeated except that the polyethylene sheets are replaced with ethylene-vinyl acetate copolymer (16 percent vinyl acetate) sheets of the same thickness. The device is effective to administer 180 micrograms of progesterone per day.

EXAMPLE 5

Milled crystals of medroxyprogesterone acetate (25 parts by weight) are mixed with polydimethylsiloxane (70 parts by weight; Dow Corning Silastic 382), and silicone oil (5 parts by weight; Dow Corning 360). After stirring the mixture well, a stannous octoate catalyst is added and the mixture injected into a polyethylene tube having an inside diameter of 0.125 inch and an outside diameter of 0.157 inch. The silicone rubber matrix cures within the tube in about 30 minutes. Thereafter, the tube is bent to a ring having a circumference of 23 cm and the ends sealed together using cyanoacrylate adhesive. The device is placed in the vagina at the mouth of the cervix and regulates fertility by slow release of medroxyprogesterone acetate at a slow rate.

While the invention has been shown and described and pointed out with reference to certain preferred embodiments thereof, those skilled in the art will appreciate that various changes, modifications, substitutions, and omissions can be made by those skilled in the art without departing from the spirit of the invention. It is intended, therefore, that the invention by limited only by the scope of the claims which follow.

What is claimed is:

1. A drug-delivery system for the continuous and controlled administration of drug to a body comprising in combination:
   a. a solid inner matrix material having solid particles of said drug dispersed therethrough, said inner matrix being permeable to passage of said drug by diffusion; and
   b. an outer polymeric membrane, insoluble in body fluids, surrounding said inner matrix, said polymeric membrane characterized by being formed of a drug release rate controlling material which is permeable to passage of said drug by diffusion but at a rate which is lower than through said inner matrix material,
   c. and wherein the system is so constructed and arranged that when placed in the environment of use, the outer polymeric membrane continuously meters the flow of drug from the inner matrix material to the exterior of the system at a controlled and constant rate over a prolonged period of time.

2. The drug-delivery system of claim 1 wherein said inner matrix material is silicone rubber.

3. A drug-delivery system for the continuous and controlled administration of drug to a body comprising in combination:
   a. an inner mass transfer conductor material saturated with dissolved drug and additionally having solid particles of said drug dispersed therethrough, said inner material being permeable to passage of said drug by diffusion;
   b. a polymeric membrane, insoluble in body fluids, surrounding said inner mass transfer conductor material, said polymeric membrane being permeable to passage of said drug by diffusion but at a lower rate than the rate of diffusion of drug through said inner mass transfer conductor material, and
   c. wherein the system is so constructed and arranged that when placed in the environment of use, the outer polymeric membrane continuously meters the flow of drug from the inner mass transfer conductor material to the exterior of the system at a controlled and constant rate over a prolonged period of time.

4. The drug-delivery system of claim 3 wherein said polymeric membrane is an ethylene-vinyl acetate copolymer.

5. The drug-delivery system of claim 3 wherein said drug is progesterone.

6. The drug-delivery system of claim 3 wherein said polymeric membrane is polyethylene.

7. The drug-delivery system of claim 4 wherein said drug is progesterone.

8. The drug-delivery system of claim 3 wherein the polymeric membrane is selected from the group consisting of plasticized or unplasticized polyvinylchloride.

9. The drug-delivery system of claim 3 wherein said drug is progesterone.

10. A drug-delivery system for the continuous and controlled administration of drug to a body comprising in in combination:
    a. a solid inner matrix material having solid particles of said drug dispersed therethrough, said inner matrix being permeable to passage of said drug by diffusion; and
    b. an outer polymeric membrane, insoluble in body fluids, surrounding said inner matrix, said polymeric membrane characterized by being formed of a drug release rate controlling material which is permeable to passage of said drug by diffusion but at a rate which is not more than one half said drug's rate of diffusion through said inner matrix material, and
    c. wherein the system is so constructed and arranged that when placed in the environment of use, the outer polymeric membrane continuously meters the flow of drug from the inner matrix material to the exterior of the system at a controlled and constant rate over a prolonged period of time.

11. A drug-delivery system for the continuous and controlled administration of drug to a body comprising in combination:
    a. a solid inner matrix material having solid particles of said drug dispersed therethrough, said inner matrix being permeable to passage of said drug by diffusion; and
    b. an outer polymeric membrane, insoluble in body fluids, surrounding said inner matrix, said polymeric membrane characterized by being formed of a drug release rate controlling material which is permeable to passage of said drug by diffusion but at a rate which is not more than one tenth said drug's rate of diffusion through said inner matrix material, and
    c. wherein the system is so constructed and arranged that when placed in the environment of use, the outer polymeric membrane continuously meters the flow of drug from the inner matrix material to the exterior of the system at a controlled and constant rate over a prolonged period of time.

* * * * *